(12) United States Patent
Hori et al.

(10) Patent No.: US 7,469,967 B1
(45) Date of Patent: Dec. 30, 2008

(54) FRAME ASSEMBLY OF AUTOMOTIVE SEAT

(75) Inventors: Takuya Hori, Akishima (JP); Kazuya Imayou, Akishima (JP)

(73) Assignee: Tachi-S Co., Ltd., Tokyo (JP)

( * ) Notice: Subject to any disclaimer, the term of this patent is extended or adjusted under 35 U.S.C. 154(b) by 0 days.

(21) Appl. No.: 11/763,002

(22) Filed: Jun. 14, 2007

(51) Int. Cl.
*A47C 7/02* (2006.01)
*B60N 2/00* (2006.01)

(52) U.S. Cl. .............................. 297/452.18; 297/354.12

(58) Field of Classification Search ............ 297/452.18, 297/354.12, 354.1, 361.1
See application file for complete search history.

(56) References Cited

U.S. PATENT DOCUMENTS

| | | | | |
|---|---|---|---|---|
| 3,926,474 A | * | 12/1975 | Johndrow et al. | 297/354.12 |
| 4,588,228 A | * | 5/1986 | Nemoto | 297/452.18 |
| 4,695,097 A | * | 9/1987 | Muraishi | 297/452.18 |
| 5,509,716 A | * | 4/1996 | Kolena et al. | 297/216.13 |
| 5,769,499 A | * | 6/1998 | Dudash et al. | 297/452.18 |
| 6,000,757 A | * | 12/1999 | Sovis | 297/344.1 |
| 6,375,267 B1 | * | 4/2002 | Ishikawa | 297/452.18 |
| 6,761,412 B1 | * | 7/2004 | Garnweidner et al. | 297/452.18 |
| 7,066,552 B2 | * | 6/2006 | Yoshida | 297/452.18 |
| 7,284,800 B2 | * | 10/2007 | Ishizuka | 297/452.18 |

* cited by examiner

*Primary Examiner*—Milton Nelson, Jr.
(74) *Attorney, Agent, or Firm*—Browdy and Neimark, P.L.L.C.

(57) ABSTRACT

In a frame assembly of an automotive seat, two lateral frame members of a seat back frame are respectively rotatably connected to two base frames via a reclining device, and a securing frame is connected between the two lateral frame members of seat back frame. Two hinge brackets are respectively disposed inwardly of and pivoted to two back end portions of a seat cushion frame. The two hinge brackets are then securely connected with the securing frame, whereupon the two back end portions of seat cushion frame are rotatably connected with the seat back frame via the two hinge brackets and securing frame.

4 Claims, 4 Drawing Sheets

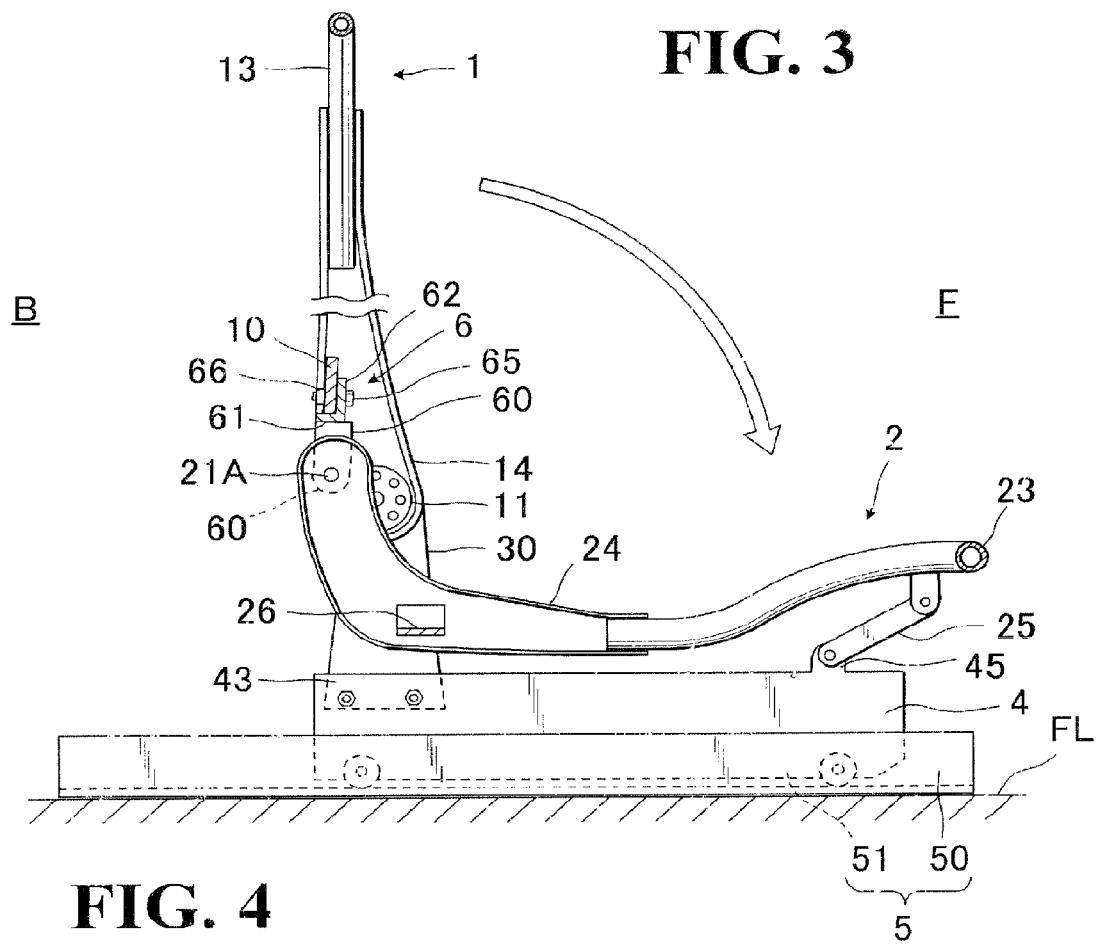

FRAME ASSEMBLY OF AUTOMOTIVE SEAT

BACKGROUND OF THE INVENTION

1. Field of the Invention

The present invention generally relates to a framework of automotive seat, and in particular, the invention is directed to a frame assembly of automotive seat wherein a seat back is pivotally connected via a reclining device with a seat cushion.

2. Description of Prior Art

In general, a typical mode of automotive seat is formed by a seat cushion and a seat back, in such a manner that a seat back frame provided in the seat cushion is rotatably connected by a hinge to a predetermined point of the seat cushion frame provided in the seat cushion, with a reclining device operatively provided between the seat back frame and seat cushion frame, thereby enabling a seat occupant to adjustingly incline the seat back to a desired back support point with respect to the seat cushion.

In the seat of this kind, a slide rail device is provided under the seat cushion to permit for adjustment of position of the seat in forward and backward directions. The slide rail device comprises a lower rail fixed on the floor and an upper rail slidably engaged with the lower rail. Typically, a base frame is formed integrally with the said upper rail of slide rail device, and the seat back frame is coupled with such base frame via the reclining device so as to permit its adjustable inclination with respect to the seat cushion frame.

Generally stated, in actual mode of the seat framework of this kind, a pair of the afore-said hinges are provided for pivotal connection of two lateral frame members of the seat cushion frame with the respective two lateral frame members of the seat back frame, so that the seat back is rotatable vertically relative to the two hinges in a direction to and away from the seat cushion. Further, a pair of the afore-said slide rail devices are provided in such a rails are formed with a base frame, thus providing a pair of base frames. Consequently, as commonly done, each of the two lateral frame members of the seat back frame are engaged with the pair of base frames, via a reclining device, thereby allowing the seat back to be adjustingly inclinable through operation of the reclining device.

However, the above conventional seat frame assembly present the following problems; (i) both of the hinges and reclining device are collectively only engaged to the two lateral frame portions of the seat back frame only in a manner to close to each other, resulting in the bolts and outer elements of the hinges projecting from the seat back frame lateral frame portions and interfering with or damaging a reclining cover covering the reclining device, and (ii), in assembly, the two lateral frame portions of the seat back frame are first brought to a point where they stand outwardly and laterally of the respective two lateral frame portions of the seat cushion frame, and then connected therewith via bolts or pins. As a consequence, the seat framework becomes complicated making it difficult for workers to assembly the seat back frame with the seat cushion frame, slowing assembly of the seats.

SUMMARY OF THE INVENTION

In view of the afore-stated drawbacks, it is a purpose of the present invention to provide an improved frame assembly of automotive seat which is simplified in structure and easy to assemble.

In order to achieve such purpose, a frame assembly of an automotive seat in accordance with the present invention is basically comprised of:

a seat back frame including a pair of lateral frame members;
a securing frame connected between the pair of lateral frame members of seat back frame;
a seat cushion frame including a pair of backward end portions, each facing backwardly of the frame assembly;
a pair of base frames;
the pair of lateral frame members of seat back frame being rotatably connected with the respective pair of base frames by means of a reclining device;
the pair of backward end portions of the seat cushion frame being disposed between and inwardly of the pair of lateral frame members of seat back frame; and
a pair of hinge brackets rotatably provided on the respective pair of backward end portions of seat cushion frame;
wherein the pair of hinge brackets are securely connected with the securing frame, so that the pair of backward end portions of seat cushion frame are rotatably connected with the seat back frame via the pair of hinge brackets and the securing frame.

Preferably, said pair of hinge brackets each may comprise: a horizontal plate portion; a pivotal connection plate portion extending vertically from the horizontal plate portion in one direction; a securing plate portion extending vertically from the horizontal plate portion in another direction opposite to such one direction, whereupon the afore-said pair of hinge brackets are pivotally connected, at the respective two pivotal connection plate portions thereof, with said pair of backward end portions of said seat cushion frame, respectively, and are also securely connected, at the respective two securing plate portions thereof, with the afore-said securing frame.

Other various features and advantages of the present invention will become apparent from reading of the description, hereinafter, with reference to the annexed drawings.

BRIEF DESCRIPTION OF THE DRAWINGS

FIG. 3 is a sectional view taken along the line III-III in the FIG. 1;

FIG. 4 is a partly broken exploded view showing a principal part of the present invention;

DETAILED DESCRIPTION OF PREFERRED EMBODIMENT OF THE INVENTION

Referring to FIGS. 1 to 6, there is illustrated one exemplary embodiment of a frame assembly of an automotive seat in accordance with the present invention.

Figure 1:
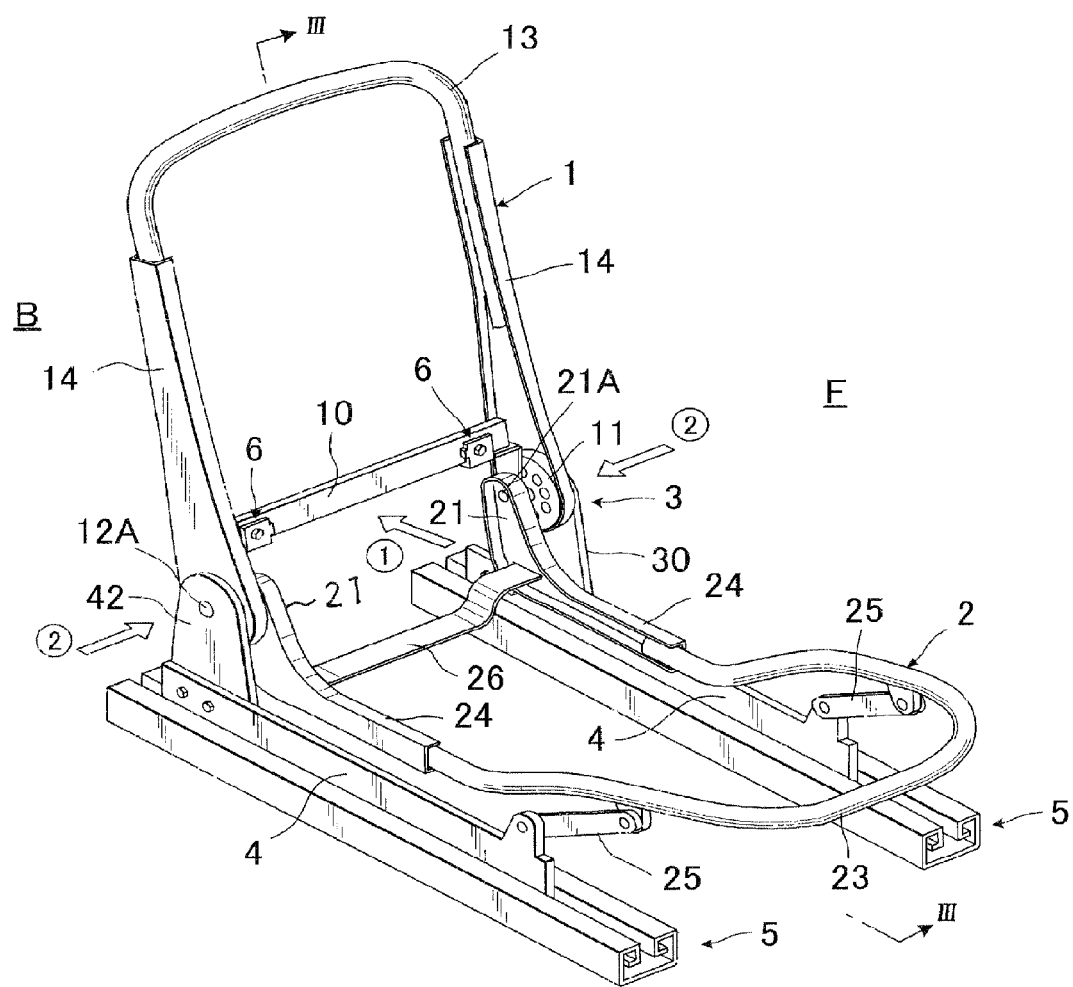
FIG. 1 is a schematic perspective view showing a frame assembly of an automotive seat in accordance with the present invention.
Figure 2:
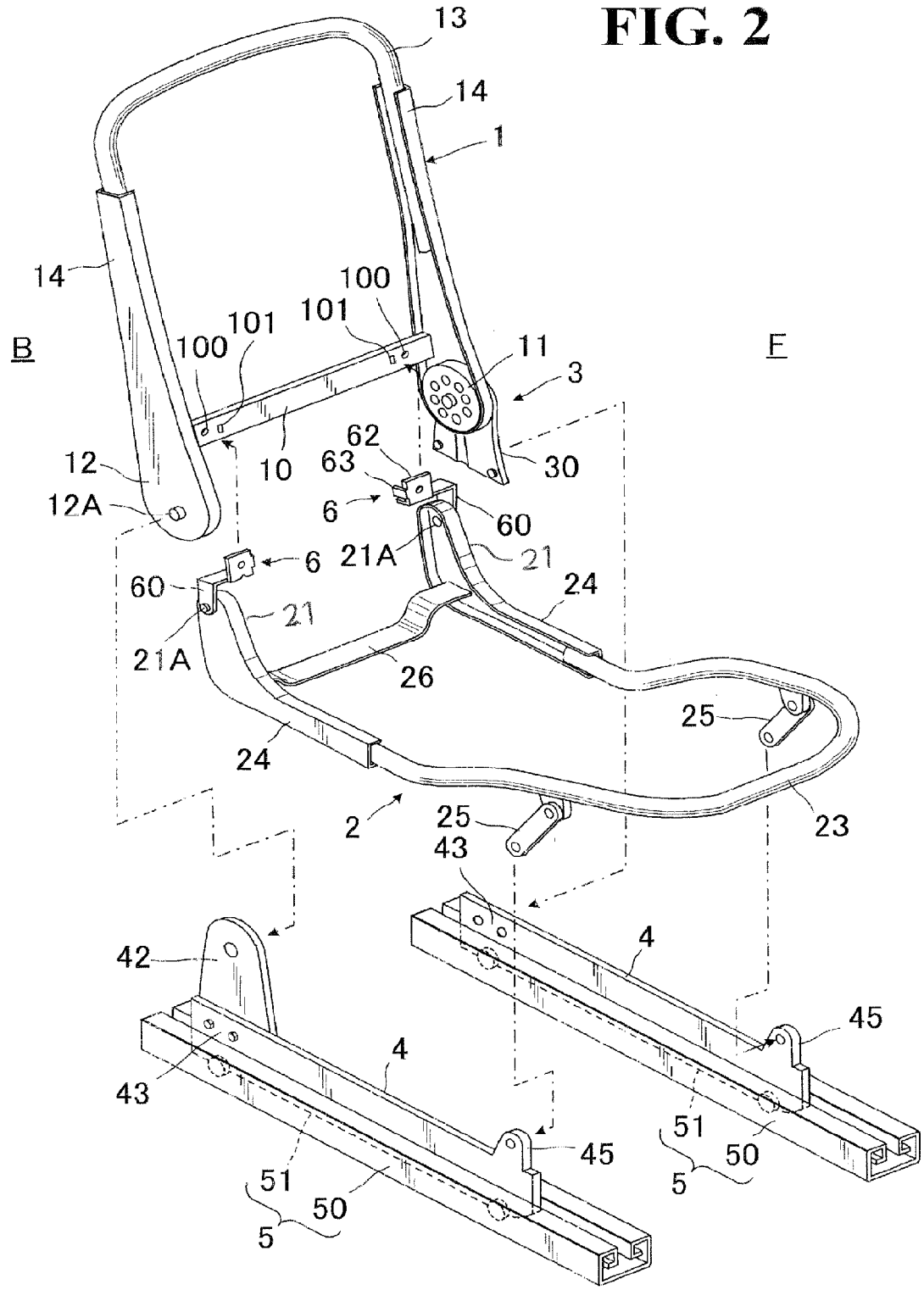
FIG. 2 is an exploded schematic perspective of the frame assembly of the automotive seat.
Figure 5:
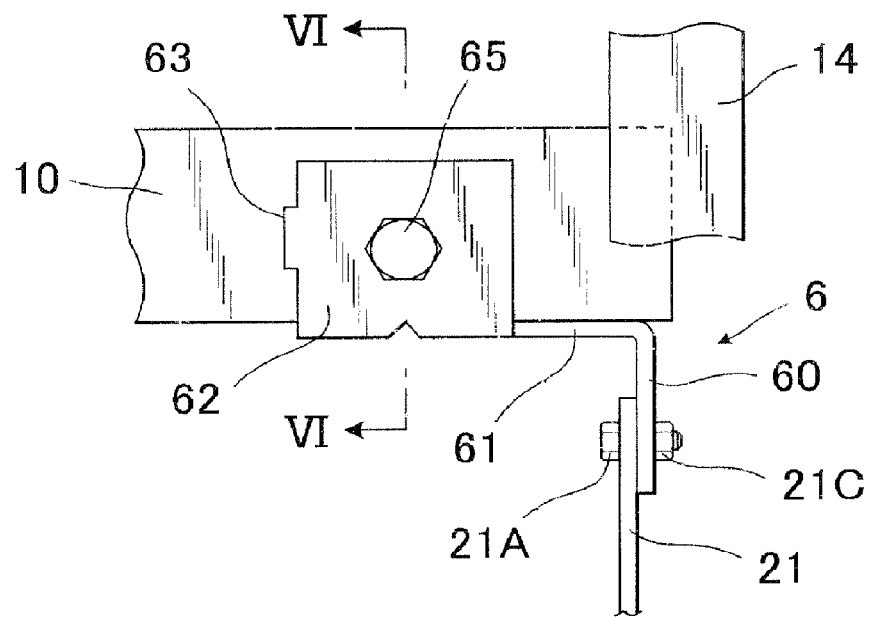
FIG. 5 is a partly broken front view showing the principal part of the present invention.
Figure 6:
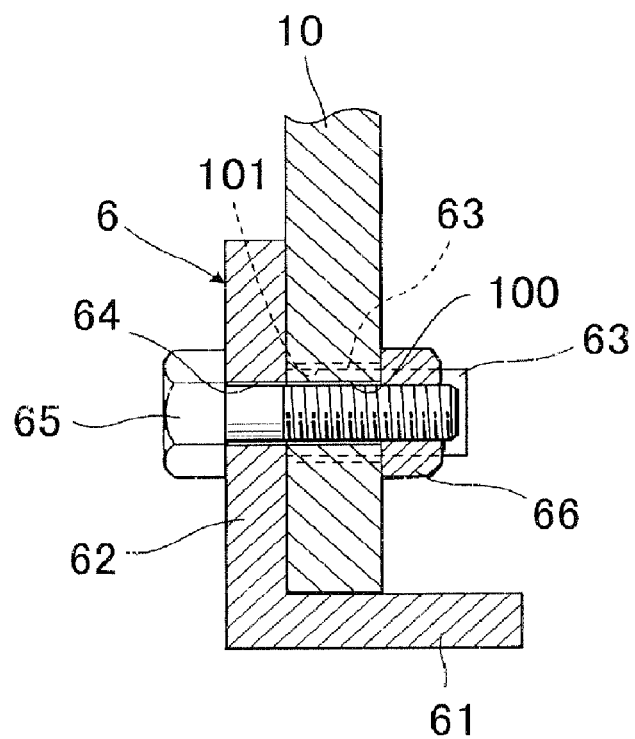
FIG. 6 is a sectional view taken along the VI-VI in the FIG. 5.

As see in FIGS. 1 and 2, the frame assembly of the present invention includes the following conventional elements: a seat back frame (1); a seat cushion frame (2); a pair of slide rail devices (5)(5); and a pair of base frames (4)(4).

It is noted that the wording, "forward" or "forwardly" refers to a side (F) forward of the seat assembly, whereas the wording, "backward" or "backwardly", refers to a side (B) backwardly of the seat assembly.

The sear back frame (1) is formed by an upper frame member (13) and a pair of lateral frame members (14)(14), as conventionally known in the art. As shown, the two lateral frame members (14) are at the respective upper portions thereof fixed to the upper frame member (13).

In this regard, in accordance with the present invention, a securing frame (10) is fixedly connected between the two lower regions respectively of the foregoing two lateral frame members (14). As will be elaborated, the securing frame (10) is provided for allowing a pair of hinge brackets (6)(6) to be securely attached thereto, with a view to facilitating the ease with which the seat cushion frame (2) is assembled with the seat back frame (1). The securing frame 910) itself is formed from a rigid plate material having a certain width or a surface area sufficient to receive the hinge brackets (6) thereon and also serves as a reinforcement to the two lateral frame members (14).

As best seen FIG. 2, one of the two lateral frame members (14) has a lower end portion in which a reclining device (11) is provided at a point below the securing frame (10), whereas another of the two lateral frame members (14) has a lower end portion in which a hinge pin (12A) associated with the reclining device (11) is provided at a point below the securing frame (10).

Each of the two slide rail devices (5) includes a lower rail (50) fixed to a floor (FL) and an upper rail (51) slidably fitted in the lower rail (50) via rollers or the like, so that the upper rail (51) is free to move forwardly and backwardly along the lower rail (50).

The pair of base frames (4) are each slidably engaged on the afore-said upper rail (51) so as to project upwardly from the lower rail (50).

Designation (30) denotes a lower arm of the reclining device (11) adapted for connection with one connecting area (43) associated with one of the two base frames (4).

The seat cushion frame (2) is formed by: a generally U-shaped forward frame member (23); a pair of lateral frame members (24)(24); and a backward frame member (26). While not designated, it is observed that each of the two lateral frame members (24) is of generally "L" shape having a horizontally extending forward portion fixed to and along one lateral portion of the forward frame member (23) and an vertical backward end portion (21) extending upwardly from that horizontally extending forward portion. The backward frame member (26) is fixedly connected between the two lateral frame members (24).

Designations (25)(25) denote a pair of connecting links, each being at one end thereof pivotally connected with the forward frame member (23) of seat cushion frame (2), as illustrated.

Designation (42) denotes another lower arm associated with hinge pin (12A) of the reclining device (11), which is fixedly connected with another connecting area (43) of another of the two base frames (4).

In accordance with the present invention, as stated earlier, a pair of hinge brackets (6)(6) are hingedly and rotatably provided on the respective two backward end portions (21) of the two seat-cushion-frame lateral frame members (24). A specific description will now be made of one of the two hinge brackets (6) for the sake of simplicity.

As best seen in FIG. 4, the hinge bracket (6) is so formed to have a horizontal plate portion (61), a securing plate portion (62), and a pivotal connection plate portion (60), in such a manner that the securing plate portion (62) extends upwardly from an end of the horizontal plate portion (61), whereas the pivotal connection plate portion (60) extends downwardly from an end of the horizontal plate portion (61).

More specifically, as viewed from FIG. 4, the securing plate portion (62), disposed on the end of horizontal plate portion (61), extends continuously and vertically from one lateral edge of the horizontal plate portion (61) at a right angle, wherein such particular one lateral edge of horizontal plate portion (62) itself faces forwardly with respect to the horizontal plate portion (61). Further, a positioning piece (63) is integrally formed in the lateral edge of that securing plate portion (62) so as to project therefrom in parallel with and above the horizontal plate portion (61). In other words, the positioning piece (63) is bend at a right angle from the lateral edge of securing plate portion (62) in a direction to a side where the horizontal plate portion (61) lies. It therefore follows that the positioning piece (63) projects backwardly with respect to the horizontal plate portion (61). The securing plate portion (62) also has a securing hole (64) formed therein.

The pivotal connection plate portion (60) extends continuously and downwardly from the end of the horizontal plate portion (61) at a right angle, and has a connecting hole (60A) formed in the free end portion thereof.

As understandable from FIG. 4, the above-constructed hinge bracket (6) is pivotally connected with the backward end portion (21) of the seat-cushion-frame lateral frame member (24), by inserting a bolt (21A) through a hole (21B) formed in that particular backward end portion (21) as well as through the connecting hole (60A) of the hinge bracket (6) and then threadedly engaging the bolt (21A) in the nut (21C). In that way, a pair of hinge brackets (6)(6) are pivotally connected with the respective two backward end portions (21) respectively of the two seat-cushion-frame lateral frame members (24), so that both horizontal and securing plate portions (61) and (62) of each of the two hinge brackets (6) are rotatable forwardly and backwardly relative to the bolt (21A).

Further, in accordance with the present invention, one set of securing hole (100) and positioning hole (101) and another set of securing hole (100) and positioning hole (101) are defined in the securing frame (10). Such two sets of holes (100 and 101) are in correspondence with the respective aforementioned pair of hinge brackets (6). namely, as far as the present embodiment is concerned, in any one of those two sets, the securing hole (100) is equal in diameter to the securing hole (64) of the hinge bracket (6), and the positioning hole (101) is formed rectangular in conformity with or slightly larger than the rectangular cross-section of the positioning piece (63) of the hinge bracket (6). Further, the securing hole (100) and positioning hole (101) are arranged in the securing frame (10) so as to be in alignment with the securing hole (64) and positioning piece (63), respectively, when the hinge bracket (6) is connected with the securing frame (10), which will be explained later.

Now, a description will be made on how the above-described elements are put together to form the frame assembly of the present invention.

In accordance with the present invention, the first step is to connect the seat cushion frame (2) with the seat back frame (1). As stated earlier, the pair of hinge brackets (6)(6) are rotatably connected with the two backward end portions (21) (21) respectively of the two seat-cushion-frame lateral frame members (24)(24). In particular, both two securing plate portions (62) respectively of the two hinge brackets (6) are disposed inwardly of the seat cushion frame (2) and therefore can be directly brought to a point between the two lateral frame members (14) of the seat back frame (1). Thus, the backward end portion (21) of the seat cushion frame (2) is first positioned in front of the seat back frame (1) and then brought thereto in a direction from a forward side (at F) to a backward side (at B) of that particular seat back frame (1), as indicated by the arrow ① in FIG. 1. This means that the backward end portion (21) of seat cushion frame (2) can be positioned inwardly of the two seat-back-frame lateral frame members (14), without interference with the latter (14) and without interference with the reclining device (11) as well as with any other elements associated with the reclining device (11), and that both two hinge brackets (6) are easily accessible to the securing frame (10).

Then, the two hinge brackets (6) are both directly brought to the securing frame (10) in a direction to the backward side (B). In this regard, as understandable from FIGS. 2 and 4, with regard to one of the two hinge brackets (6), the positioning piece (63) thereof, which faces backwardly as stated above, is first naturally inserted in the corresponding positioning hole (101) of the securing frame (10), with much ease, and then, the securing plate portion (62) of the hinge bracket (6) in contacted on the forwardly facing surface of the securing frame (10). This, the securing hole (64) of the former (6) is precisely aligned with the securing hole (100) of the latter (10). Thereafter, a securing bolt (65) is inserted through the thus-aligned two holes (64)(100) and threadedly engaged in a securing nut (66), so that the securing plate portion (62) is firmly attached to the securing frame (10). In that way, one of the two hinge brackets (6) is rotatably connected with the securing frame (10).

Of course, it is to be understood that another of the two hinge brackets (6) is simultaneously connected with the securing frame (10), with much ease, since the backwardly facing positioning piece (101) thereof is smoothly inserted in another corresponding positioning hole (101) and the securing plate portion (62) thereof is firmly attached with the securing frame (10) by bolt (65) and nut (66) via the aligned securing holes (64)(100), in the same manner as described above.

Thus, the seat cushion frame (2) is directly and easily connected with the seat back frame (1) via the foregoing two hinge brackets (6).

Next, the two lower end portions of the seat back frame 91) are brought to a point where they are located right above the respective two connecting areas (43)(43) of the two base frames (4)(4). Then, the lower arm (30) associated with the seat back frame (1) is firmly connected to the connecting area (43) defined in the backward end portion of one of the two base frames (4), while on the other hand, the pin (12A) associated with seat back frame (1) is rotatably connected with the lower arm (42) that has been fixed on the connecting area (43) defined in the backward end portion of another of the two base frames (4). It is seen that such assembling process are taken in a direction laterally of the seat assembly being formed, as indicated by the two arrows ②② in FIG. 1. At the same time, the two free ends respectively of the two connecting links (25)(25) are pivotally connected with the two connecting areas (45)(45) defined in the respective two forward end portions respectively of the two base frames (4).

Accordingly, there is provided a resultant frame assembly of automotive seat, as shown in FIG. 1. Of course, by virtue of the hinge brackets (6), the seat back frame (1) may be adjustably inclined by a desired angle by operation of the reclining device (11) or folded down onto the seat cushion frame (2), as indicated by the arrow in FIG. 3.

With the above-described arrangement of the present invention, it is to be appreciated that:

(i) The pair of hinge brackets (6) are disposed between and inwardly of the two backward end portions (21) respectively of the two seat-cushion-frame members (24) and connected with the securing frame (10). Thus, both two hinge brackets (6) do not project outwardly and laterally toward the reclining device (11), but they are disposed inwardly of the seat frame and distant from the reclining device (11) and other related elements of the reclining device (11).

(ii) In particular, the securing plate portion (62) of each of the two hinge brackets (6) is disposed inwardly of the backward end portion (21) associated with the seat cushion frame (2) and may normally be set so as to stand vertically from that backward end portion (21). Further, the securing plate portion (62) has the positioning piece (63) facing backwardly of the seat cushion frame (2). This arrangement makes readily and directly accessible the securing plate portion (62) to the securing frame (10) and also allows the former (62) to be easily secured to the latter (10) in place, because, by simply inserting the positioning piece (63) of the hinge bracket (6) in the positioning hole (101) of the securing frame (10), the securing plate portion (62) is quickly located at a given position on the securing frame (10), while the securing hole (64) of the hinge bracket (6) is automatically aligned with the securing hole (100) of the securing frame (10). Hence, the securing plate portion (62) can easily and quickly be secured to the securing frame (10) by inserting the bolt (65) through the aligned securing holes (64)(100) and threadedly engaged the same with the nut (66).

(iii) In view of the aspects (i) and (ii) above, the backward end portion (at 21) of seat cushion frame (2) is easily accessible to a forward side (F) of the seat back frame (1) and can be directly brought to that seat back frame (1) in a direction from that forward side (F) to a backward side (B) of the seat back frame (1), as opposed to the conventional assembly steps which requires that a backward end portion of seat cushion frame should be accessed to a seat back frame from both two lateral sides of the seat back frame. Namely, in the present invention, a worker can simply direct the seat cushion frame (2) to the forward side (F) of the seat back frame (1) and bring the same to the seat back frame (1) as it is, as indicated by arrow ① in FIG. 1, so that the two positioned pieces (63) are inserted in the respective two positioning holes (101). In other words, the worker simply moves the seat cushion frame (2) straightforward toward the seat back frame (1), without requiring his or her complicated and troublesome manipulations as found in the prior art. This effectively expedites the processes for assembly of seat framework.

(iv) The securing and connecting elements associated with the seat cushion frame (2), such as bolts (65 and 21A), are all disposed inwardly of the seat cushion frame (2) and thus disposed inwardly of the seat back frame 91). Accordingly, those outwardly projected elements neither contact nor interfere with the reclining device (11) and other related elements of the reclining device (11).

While having described the present invention thus far, it should be understood that the invention is not limited to the illustrated embodiment, but, any other modification, replacement and addition may be applied hereto without departing from the scopes of the appended claims.

What is claimed is:

1. A frame assembly of an automotive seat comprising:
   a seat back frame including a pair of lateral frame members;
   a securing frame connected between said pair of lateral frame members of said seat back frame;
   a seat cushion frame including a pair of backward end portions, each facing backwardly of the frame assembly;
   a pair of base frames;
   said pair of lateral frame members of said seat back frame being rotatably connected with the respective said pair of base frames by means of a reclining device;

said pair of backward end portions of said seat cushion frame being disposed between and inwardly of said pair of lateral frame members of said seat back frame, and a pair of hinge brackets rotatably provided on the respective said pair of backyard end portions of said seat cushion frame, wherein said pair of hinge brackets are securely connected with said securing frame, so that said pair of backward end portions of said seat cushion frame are rotatably connected with said seat back frame via said pair of hinge brackets and said securing frame.

2. The frame assembly as claimed in claim 1, wherein said pair of hinge brackets each comprises:

a horizontal plate portion;

a pivotal connection plate portion extending vertically from said horizontal plate portion in one direction;

a securing plate portion extending vertically from said horizontal plate portion in another direction opposite to said one direction;

whereupon said pair of hinge brackets are pivotally connected, at the respective two pivotal connection plate portions thereof, with said pair of backward end portions of said seat cushion frame, respectively, and are also securely connected, at the respective two securing plate portions thereof, with said securing frame.

3. The frame assembly as claimed in claim 2, wherein said horizontal plate portion extends horizontally from said pivotal connection plate portion in a direction inwardly of said seat cushion frame, and wherein said securing plate portion extends vertically from said horizontal plate portion.

4. The frame assembly as claimed in claim 1, wherein said securing frame has a pair of positioning holes formed therein, wherein said pair of hinge brackets each comprises:

a horizontal plate portion;

a pivotal connection plate portion extending vertically from said horizontal plate portion in one direction;

a securing plate portion extending vertically from said horizontal plate portion in another direction opposite to said one direction, said securing plate portion having a positioning piece projected therefrom, whereupon said pair of hinge brackets respectively have a pair of said positioning pieces, and are pivotally connected, at the respective two pivotal connection plate portions thereof, with said pair of backward end portions of said seat cushion frame, respectively, and are also securely connected, at the respective two securing plate portions thereof, with said securing frame, such that said pair of said positioning pieces are inserted in the respective said pair of positioning holes of said securing frame.

* * * * *